(12) United States Patent
Cao et al.

(10) Patent No.: US 12,288,916 B2
(45) Date of Patent: Apr. 29, 2025

(54) BRUSH PHASE SHIFTER ADAPTED FOR MULTIPORT ANTENNA

(71) Applicant: Suzhou Luxshare Technology Co., Ltd., Suzhou (CN)

(72) Inventors: Hui Cao, Suzhou (CN); Kang-Ning Lv, Suzhou (CN); Zheng-Guo Zhou, Suzhou (CN)

(73) Assignee: SUZHOU LUXSHARE TECHNOLOGY CO., LTD., Suzhou (CN)

( * ) Notice: Subject to any disclaimer, the term of this patent is extended or adjusted under 35 U.S.C. 154(b) by 272 days.

(21) Appl. No.: 18/076,059

(22) Filed: Dec. 6, 2022

(65) Prior Publication Data
US 2024/0106098 A1 Mar. 28, 2024

(30) Foreign Application Priority Data
Sep. 27, 2022 (CN) .......................... 202211180873.6

(51) Int. Cl.
*H01P 1/18* (2006.01)
*F16H 1/22* (2006.01)
*H01Q 3/36* (2006.01)

(52) U.S. Cl.
CPC .............. *H01P 1/18* (2013.01); *F16H 1/227* (2013.01); *H01P 1/184* (2013.01); *H01Q 3/36* (2013.01)

(58) Field of Classification Search
CPC .. H01P 1/18; H01P 1/184; H01P 1/183; H01P 1/182; H01Q 3/36; H01Q 3/30; H01Q 3/32; H01Q 3/34; F16H 1/227
See application file for complete search history.

(56) References Cited

U.S. PATENT DOCUMENTS

| 11,289,799 | B2 | 3/2022 | Everest et al. | |
| 2022/0166139 | A1* | 5/2022 | Gottl | H01P 1/064 |
| 2023/0307831 | A1* | 9/2023 | Li | H01Q 3/32 |
| 2023/0402748 | A1* | 12/2023 | Lv | H01P 1/184 |

FOREIGN PATENT DOCUMENTS

| CN | 206916679 U | 1/2018 |
| CN | 211743406 U | 10/2020 |
| CN | 215418528 U | 1/2022 |

(Continued)

*Primary Examiner* — Stephen E. Jones
(74) *Attorney, Agent, or Firm* — Birch, Stewart, Kolasch & Birch, LLP

(57) ABSTRACT

A brush phase shifter includes an actuating member, a gear assembly, a main printed circuit board and a brush member. The gear assembly includes a driving gear, a transmission gear and a linkage gear. The driving gear is a bevel gear. The transmission gear includes a bevel gear portion and a cylindrical gear portion. The bevel gear portion has a large end and a small end. The cylindrical gear portion is integrally formed at the large end of the bevel gear portion. The linkage gear is a cylindrical gear. The driving gear meshes with the bevel gear portion of the transmission gear. The cylindrical gear portion of the transmission gear meshes with the linkage gear. The brush member is fixedly connected with the linkage gear. The brush member is rotatably arranged on the main printed circuit board. The present disclosure precisely controls the phase change and realize miniaturization.

17 Claims, 18 Drawing Sheets

(56) References Cited

FOREIGN PATENT DOCUMENTS

| | | |
|---|---|---|
| CN | 216251097 U | 4/2022 |
| CN | 114447610 A | 5/2022 |
| CN | 216597991 U | 5/2022 |
| CN | 216903273 U | 7/2022 |
| WO | WO 2015117279 A1 | 8/2015 |

* cited by examiner

BRUSH PHASE SHIFTER ADAPTED FOR MULTIPORT ANTENNA

CROSS-REFERENCE TO RELATED APPLICATION

This patent application claims a priority of a Chinese Patent Application No. 202211180873.6, filed on Sep. 27, 2022 and titled "brush phase shifter", the entire content of which is incorporated herein by reference.

TECHNICAL FIELD

The present disclosure relates to a brush phase shifter, belonging to the technical field of communication.

BACKGROUND

A brush phase shifter is a device capable of adjusting the phase of a wave, and any transmission medium that conducts waves in it will introduce a phase shift. The brush phase shifter is characterized by high phase shifting accuracy, and the brush phase shifter has a wide range of applications in radar, missile attitude control, accelerator, communication, instrumentation and even music. With the development of the mobile communication industry, in order to meet the needs of accurate coverage and laying costs, ESC (Electronic Speed Control) antennas have been widely used. The brush phase shifter is the core component of the ESC antenna. The ESC antenna can change the phase of the brush phase shifter to adjust the inclination of the radiation beam through the remote control transmission system, thereby realizing the adjustment of the network coverage area. At present, there are various types of brush phase shifters for base station antennas, among which fan-shaped brush phase shifters are the most common. The existing fan-shaped brush phase shifter includes a drive module, a transmission module and a brush member. Because the transmission module in the existing fan-shaped brush phase shifter includes a lead screw, the lead screw will involve linear motion, and then the linear motion is converted into the fan-shaped (a part of the circumference) motion of the brush member to achieve phase control. Therefore, the existing fan-shaped brush phase shifter has the following disadvantages: the linear motion of the lead screw makes the longitudinal span of the transmission module large, on the one hand, the transmission distance is long, and it is difficult to accurately control the phase change; on the other hand, it occupies a large space, which is not conducive to miniaturization design. Therefore, the structure design of the existing fan-shaped brush phase shifter is more complicated, which increases the difficulty of the overall layout of the antenna.

SUMMARY

An object of the present disclosure is to provide a brush phase shifter, which can not only precisely control the phase change and realize miniaturization, but also is suitable for multiport antenna, which optimizes the overall layout of the antenna.

In order to achieve the above object, the present disclosure discloses a brush phase shifter includes an actuating member, a gear assembly, at least one main printed circuit board and at least one brush member. The gear assembly includes a driving gear, a transmission gear and a linkage gear. The driving gear is a bevel gear. The transmission gear includes a bevel gear portion and a cylindrical gear portion. The bevel gear portion has a large end and a small end. The cylindrical gear portion is integrally formed at the large end of the bevel gear portion. The linkage gear is a cylindrical gear. The driving gear meshes with the bevel gear portion of the transmission gear. The cylindrical gear portion of the transmission gear meshes with the linkage gear. The brush member is fixedly connected with the linkage gear such that the brush member is rotatably arranged on the main printed circuit board.

In order to achieve the above object, the present disclosure further discloses a brush phase shifter includes an actuating member, a gear assembly, two main printed circuit boards and two brush members. The gear assembly includes a driving gear, a pair of transmission gears symmetrically positioned in an upper-lower direction and a pair of linkage gears symmetrically positioned in a left-right direction. The transmission gears include a first transmission gear and a second transmission gear. The linkage gears include a first linkage gear and a second linkage gear. The driving gear is a bevel gear. Each transmission gear includes a bevel gear portion and a cylindrical gear portion. Each bevel gear portion has a large end and a small end. The cylindrical gear portion is integrally formed at the large end of each bevel gear portion. Each linkage gear is a cylindrical gear. The driving gear meshes with the face-to-face bevel gear portions. The cylindrical gear portion meshes with the adjacent linkage gear and detaches from another distant linkage gear during rotation of each transmission gear. The main printed circuit boards include a first main printed circuit board and a second main printed circuit board axially symmetrically positioned in the left-right direction. The brush members include a first brush member and a second brush member also axially symmetrically positioned in the left-right direction. Both the first brush member is rotatably disposed on the first main printed circuit board and the second brush member is rotatably disposed on the second main printed circuit board when the actuating member actuates the gear assembly.

Compared with the prior art, the brush phase shifter of the present disclosure integrates the actuating member, the main printed circuit board and the brush members together through a gear assembly, and the gear assembly includes a driving gear, a transmission gear meshed with the driving gear, and a linkage gear meshed by the transmission gear. The precise control of the phase change is realized through the meshing rotation among the multiple gears. Furthermore, the transmission gears are numbered in two and symmetrically positioned in an upper-lower direction. The linkage gears are also numbered in two but symmetrically positioned in a left-right direction. The linkage gears are fixed to the printed circuit board, so one of the driving bevel gears can drive the upper and lower transmission gears to rotate synchronously in opposite directions, and then through the synchronous and reverse rotation of the two left and right linkage gears, the two brush members can move in a synchronous and reversed fan-shaped (a part of the circumference) motions on the corresponding two main printed circuit boards. The present disclosure can be applied to dual ports. The antenna to which the present disclosure applied can not only accurately control the synchronous change of the phase, but also realize the miniaturization of the antenna structure.

DETAILED DESCRIPTION

Figure 1:
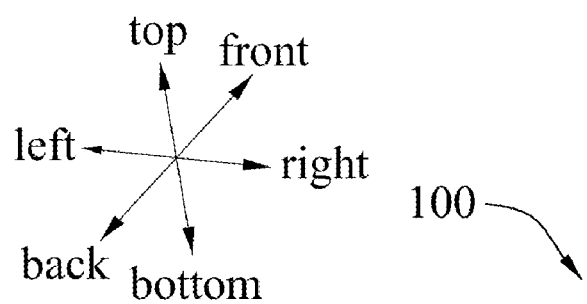
FIG. 1 is a perspective, assembled view of a brush phase shifter in accordance with a first embodiment of the present disclosure.
Figure 1:
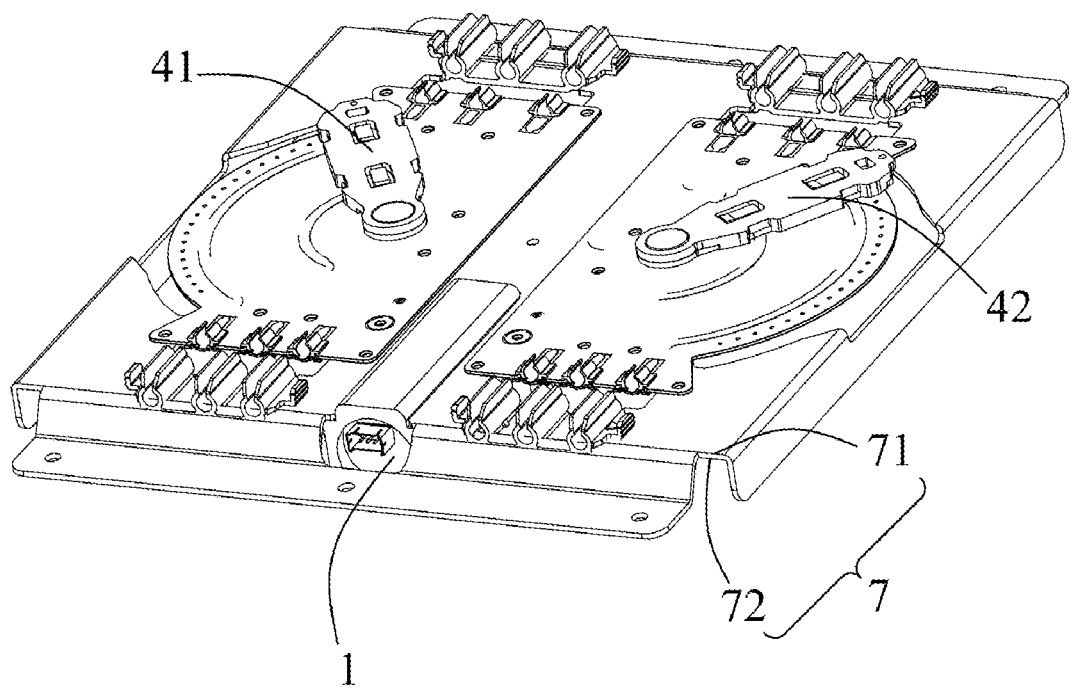
Figure 2:
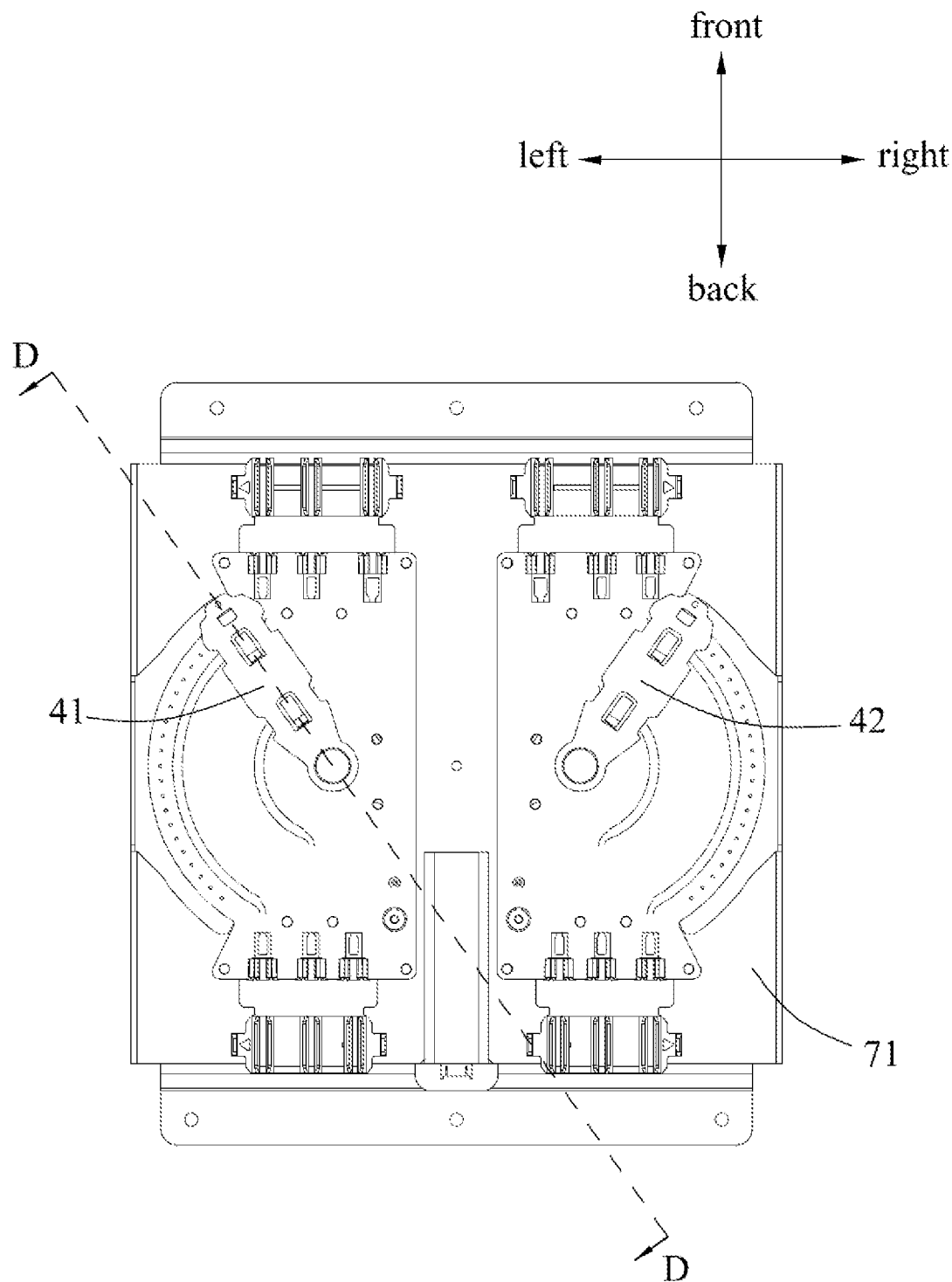
FIG. 2 is a top plan view of FIG. 1.

At least one exemplary embodiment will be described in detail here, examples of which are shown in drawings. When referring to the drawings below, unless otherwise indicated, same numerals in different drawings represent the same or similar elements. The examples described in the following exemplary embodiment do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "bottom" and/or "top" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Referring to FIGS. 1 to 25, the present disclosure relates to a brush phase shifter 100, which includes an actuating member 1, a gear assembly 2, at least one main printed circuit board 3 and at least one brush member 4. For convenience of description, as shown in FIG. 1, the brush phase shifter 100 defines a top-bottom direction, a left-right direction, and a front-rear direction. Each two of the top-bottom direction, the left-right direction, and the front-rear direction are formed in a relationship of one being perpendicular to the other. The actuating member 1 includes but is not limited to a stepped motor, and the stepped motor can realize precise control of the actuation process.

Figure 3:
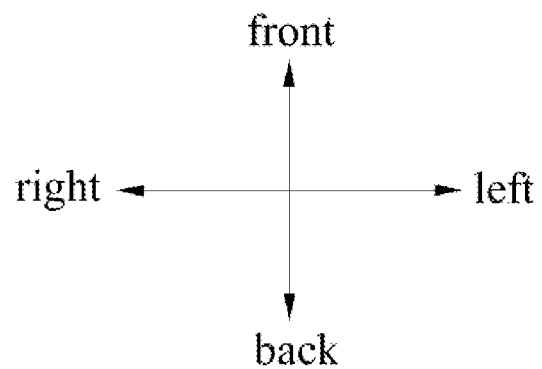
FIG. 3 is a bottom plan view of FIG. 1.
Figure 3:
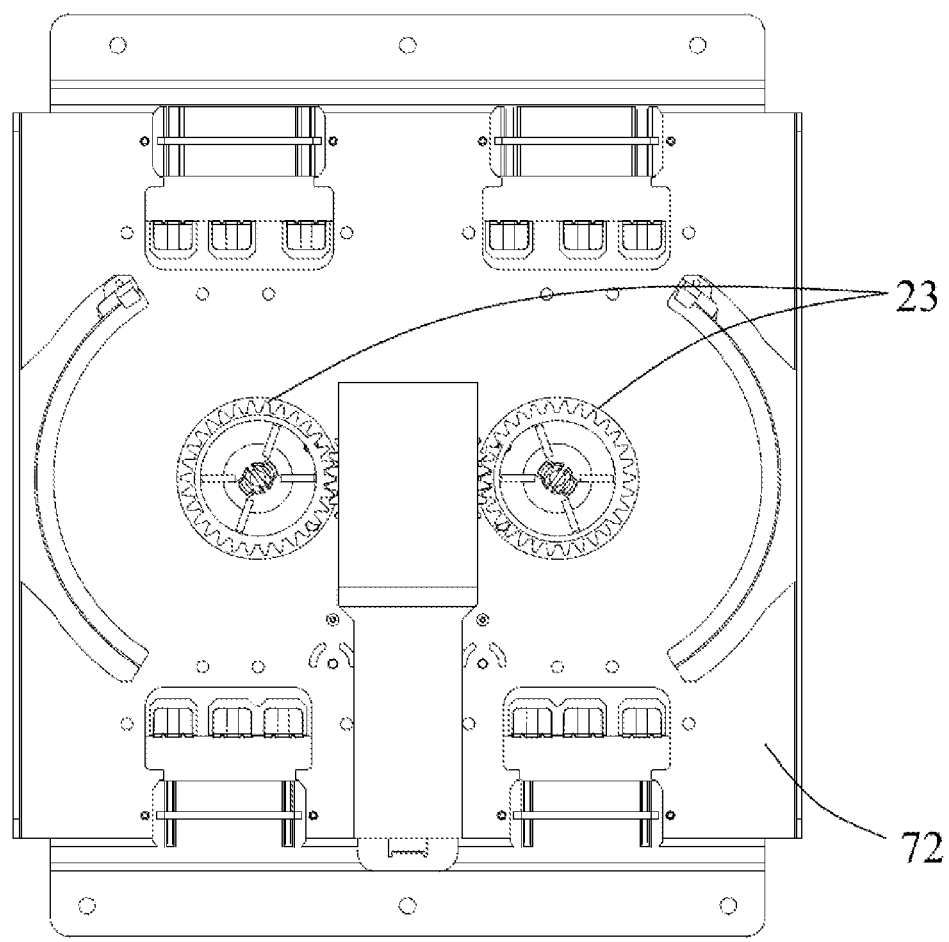
Figure 4:
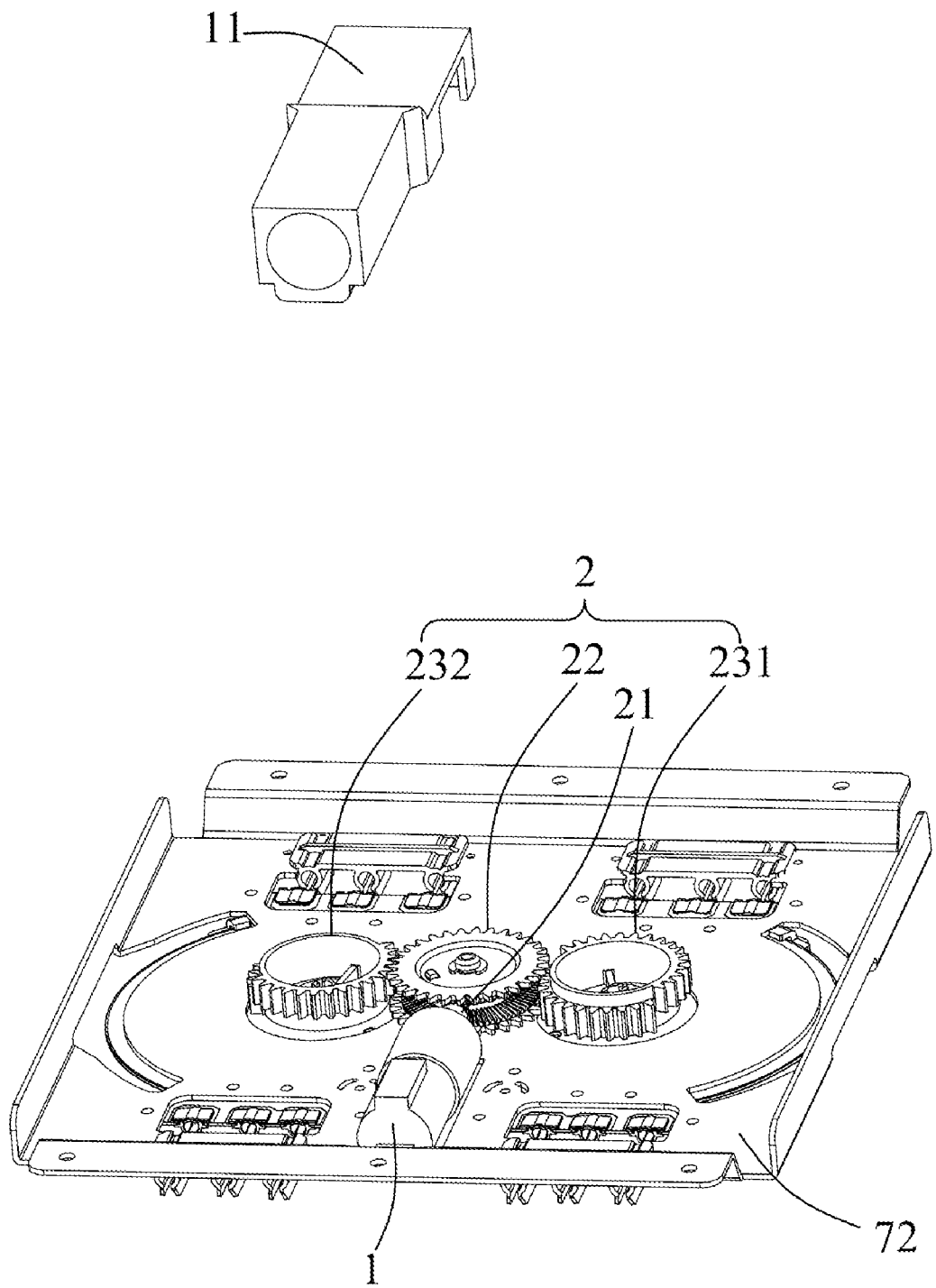
FIG. 4 is a perspective, exploded view of the brush phase shifter in accordance with the first embodiment of the present disclosure.
Figure 5:
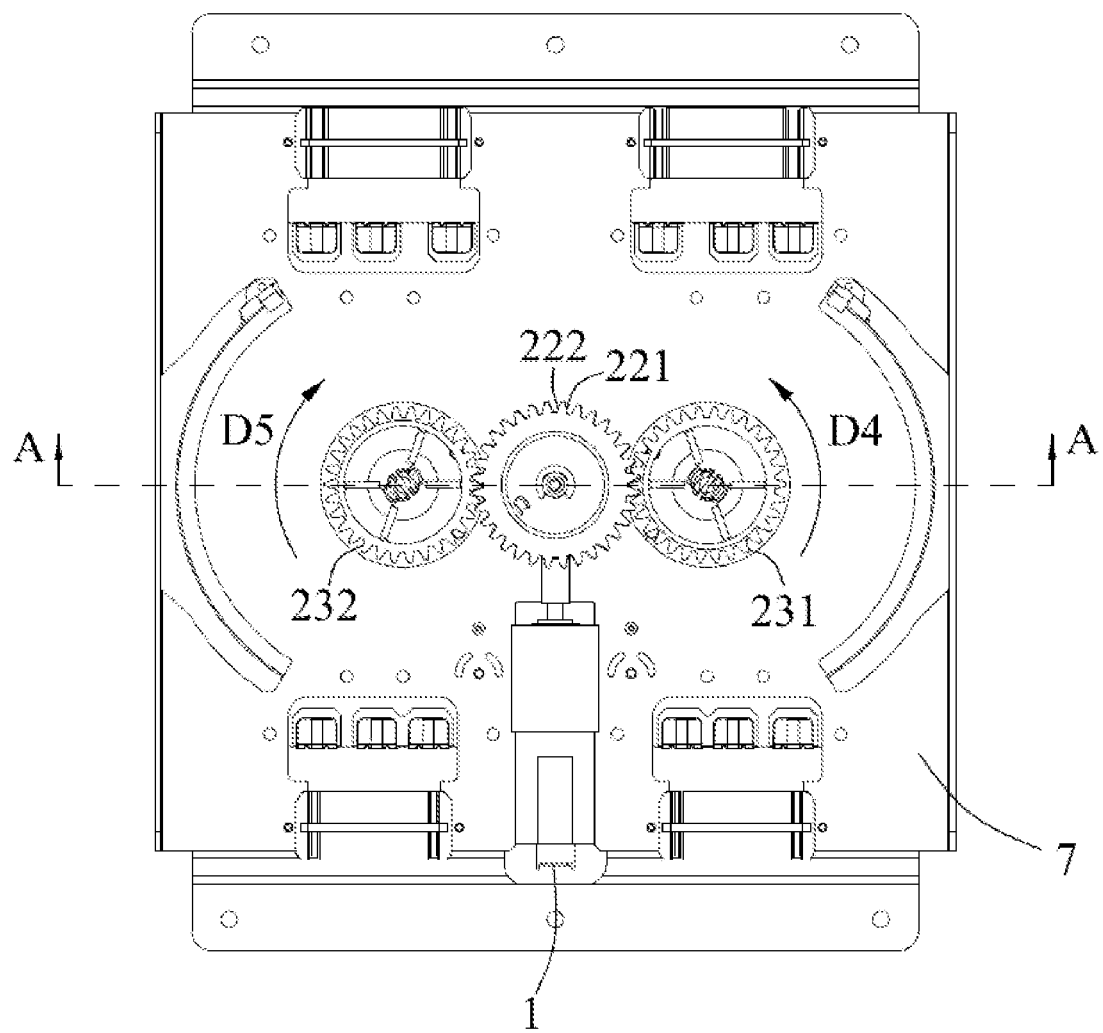
FIG. 5 is a bottom plan view of the remaining parts with the casing removed, which is similar to FIG. 3.
Figure 7:
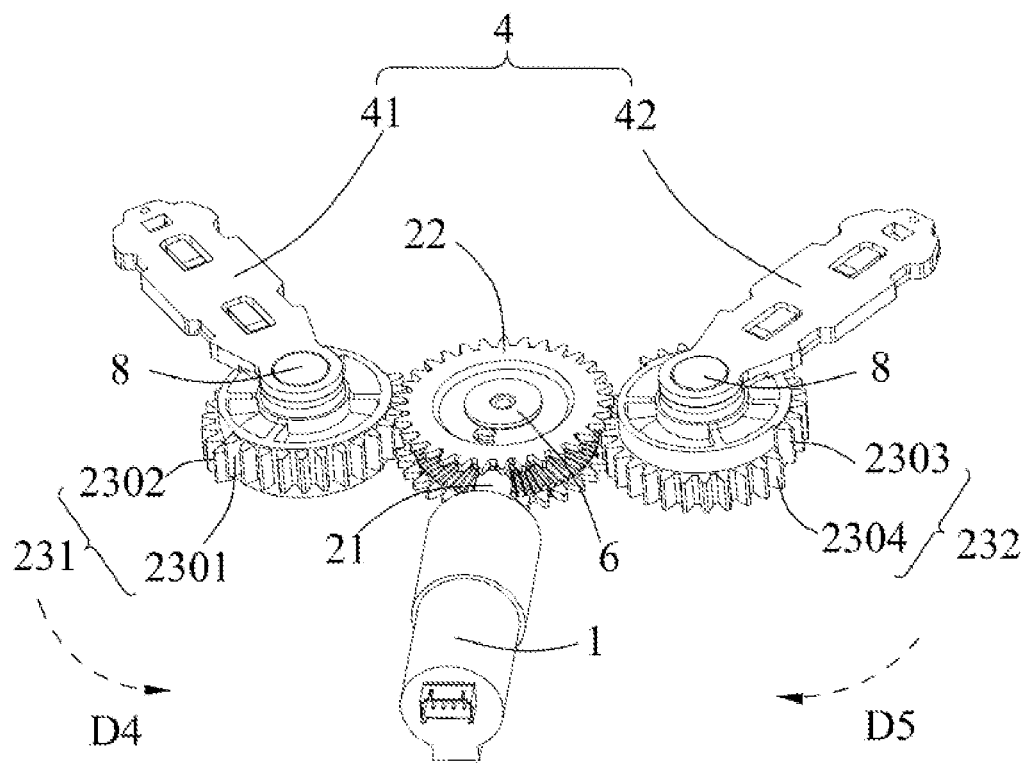
FIG. 7 is a perspective, assembled view of the combination of the actuating element, the gear assembly and the brush members, in order to clearly show the combination of the above three elements, both two main printed circuit boards which are sandwiched between the gear assembly and the brush members, and backing plates to which the two main printed circuit boards are mounted, are not shown in FIG. 7.

Referring to FIGS. 3, 4 and 7, the gear assembly 2 includes a driving gear 21, a transmission gear 22 and a linkage gear 23. The driving gear 21 is a bevel gear. The transmission gear 22 includes a bevel gear portion 2201 and a cylindrical gear portion 2202. The bevel gear portion 2201 has a large end and a small end. The cylindrical gear portion 2202 is integrally formed at the large end of the bevel gear portion 2201. The linkage gear 23 is a cylindrical gear. The driving gear 21 meshes with the bevel gear portion 2201 of the transmission gear 22. The cylindrical gear portion 2202 of the transmission gear 22 meshes with the linkage gear 23. The brush member 4 is fixedly connected with the linkage gear 23. The brush member 4 is rotatably arranged on the main printed circuit board 3 to have fan-shaped movement. In the present disclosure, the fan-shaped movement of the brush member 4 on the main printed circuit board 3 is controlled by the driving of the actuating member 1 and the transmission through the gear assembly 2 including a plurality of gears. The gears refer to the driving gear 21, the transmission gear 22 and the linkage gear 23. This fan-shaped movement can be seen as part of a circular motion. Compared with the linear transmission mode of the linear screw, the meshing rotation among the multiple gears improves the transmission efficiency, improves the transmission stability, and realizes the precise control of the phase change.

Referring to FIG. 1 to FIG. 23, the first embodiment of the present application is introduced below:

Referring to FIG. 1, FIG. 4, FIG. 7, FIG. 9 and FIG. 10, the central axis of the driving gear 21 extends in the front-rear direction. In the first embodiment, the transmission gear 22 includes a first transmission gear 221 and a second transmission gear 222. Since each transmission gear 22 includes a bevel gear portion 2201 and a cylindrical gear portion 2202, the first transmission gear 221 and the second transmission gear 222 have two of the bevel gear portions 2201 and two of the cylindrical gear portions 2202 in total. The two cylindrical gear portions 2202 are arranged at intervals in the top-bottom direction perpendicular to the front-rear direction. The two bevel gear parts 2201 are located between the two cylindrical gear parts 2202. The two bevel gear parts 2201 are face-to-face arranged so that the two bevel gear portions 2201 can mesh with the driving gear 21 at the same time. Driven by the driving gear 21, the first transmission gear 221 and the second transmission gear 222 rotate synchronously and in opposite circumferential directions.

Figure 6:
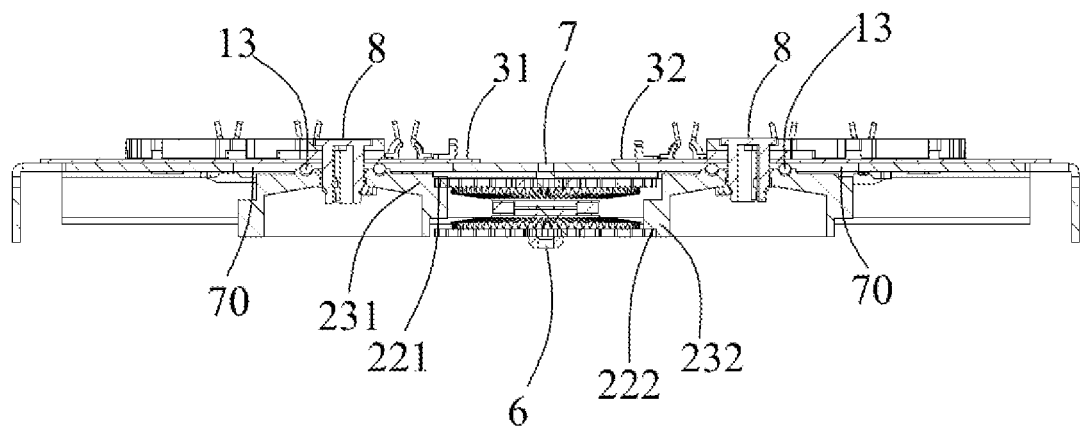
FIG. 6 is a cross-sectional view taken along line A-A in FIG. 5.
Figure 15:
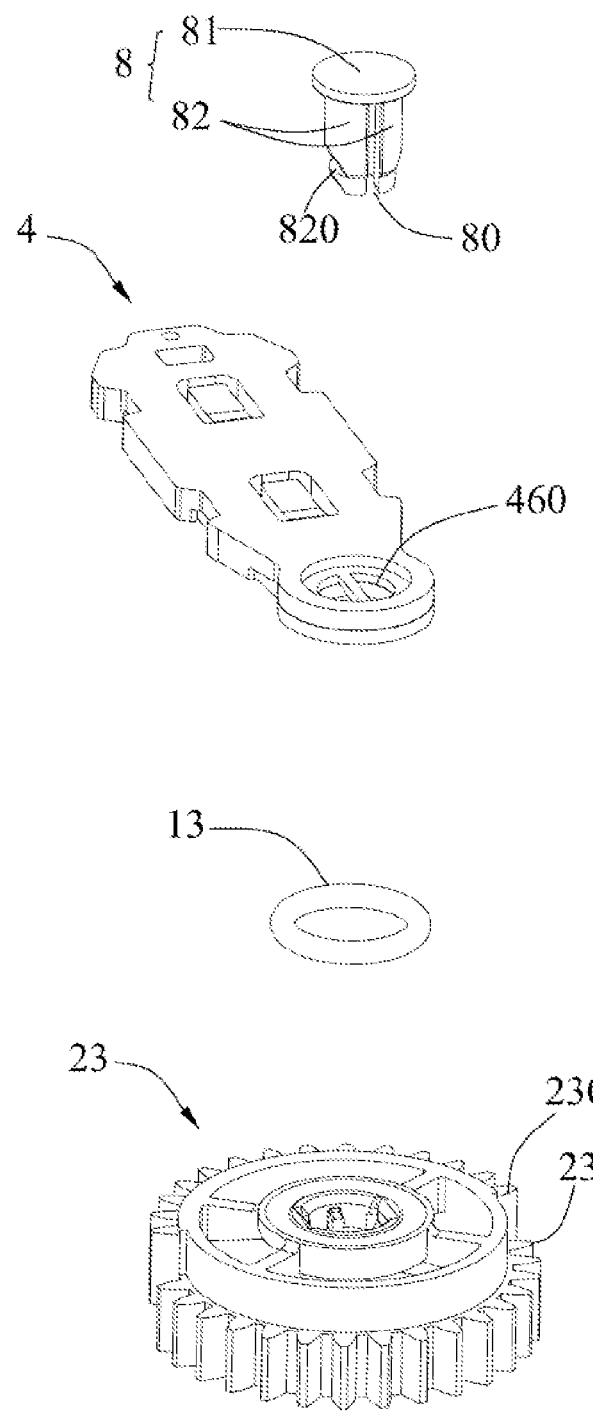
FIG. 15 is another perspective, exploded view of FIG. 13 from another angle.
Figure 16:
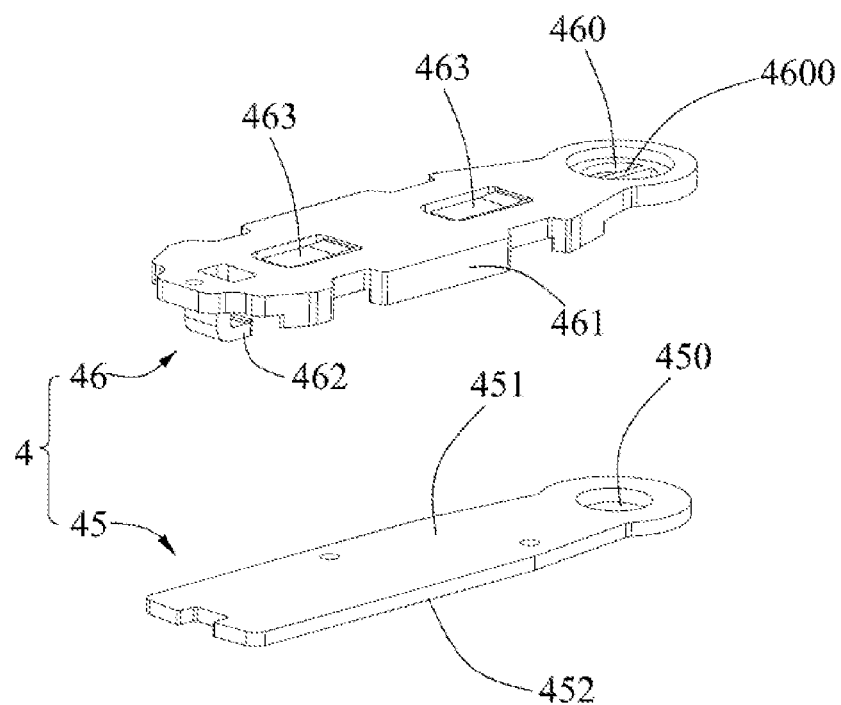
FIG. 16 is a perspective, exploded view of one brush member.
Figure 17:
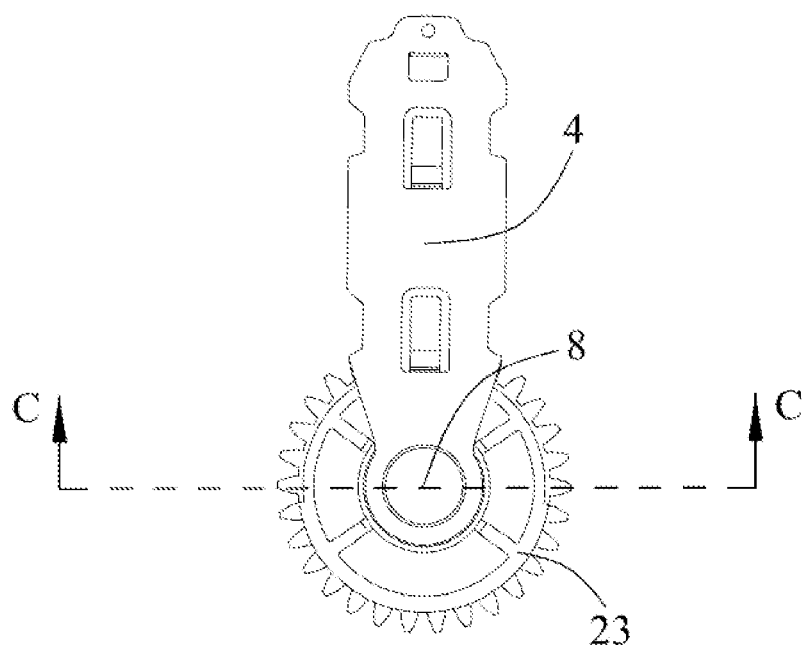
FIG. 17 is a bottom plan view of FIG. 13.

Referring to FIG. 6, FIG. 7 and FIG. 15, the linkage gear 23 includes a first linkage gear 231 and a second linkage gear 232. Each linkage gear 23 has an outer surface with a circular cross section. The first linkage gear 231 includes a first dentate portion 2301 and a second dentate portion 2302 at the outer surface of. The first dentate portion 2301 and the second dentate portion 2302 are vertically dislocated and distributed in parallel. The second linkage gear 232 includes a third dentate portion 2303 and a fourth dentate portion 2304 at the outer surface thereof. The third dentate portion 2303 and the fourth dentate portion 2304 are vertically dislocated and distributed in parallel. The shadows of the first dentate portion 2301 and the second dentate portion 2302 on the cross section of the first linkage gear 231 are connected from heading to ending, which forms a closed loop. The shadows of the third dentate portion 2303 and the fourth dentate portion 2304 on the cross section of the second linkage gear 232 are connected from heading to ending, which forms another closed loop too. The cross section of the first linkage gear 231 and the cross section of the second linkage gear 232 can be overlapped into a same plane. That is to say, the first embodiment of the present application ensures that each linkage gear 23 alternatively engages with the two transmission gears 22, but the two linkage gears 23 cannot simultaneously engage with the same transmission gear 22.

Referring to FIG. 6 and FIG. 7, when the cylindrical gear portion 2202 of the first transmission gear 221 meshes with the first dentate portion 2301 of the first linkage gear 231, as well as, when the cylindrical gear portion 2202 of the second transmission gear 222 meshes with the fourth dentate portion 2304 of the second linkage gear 232, the cylindrical gear portion 2202 of the first transmission gear 221 is separated from the third dentate portion 2303 of the second linkage gear 232, as well as, the cylindrical gear portion 2202 of the second transmission gear 222 is separated from the second dentate portion 2302 of the first linkage gear 231. When the cylindrical gear portion 2202 of the first transmission gear 221 meshes with the third dentate portion 2303 of the second linkage gear 232, as well as, when the cylindrical gear portion 2202 of the second transmission gear 222 meshes with the second dentate portion 2302 of the first linkage gear 231, the cylindrical gear portion 2202 of the first transmission gear 221 is separated from the first dentate portion 2301 of the first linkage gear 231, as well as, the cylindrical gear portion 2202 of the second transmission gear 222 is separated from the fourth dentate portion 2304 of the second linkage gear 232. Driven by the two transmission gears 22 (the first transmission gear 221 and the second transmission gear 222), the first linkage gear 231 and the second linkage gear 232 also rotate synchronously and in opposite circumferential directions.

In fact, it is not difficult to understand, the cylindrical gear portion 2202 meshes with the adjacent linkage gear 23 (for example, the first linkage gear 231) and detaches from another distant linkage gear 23 (for example, the second linkage gear 232) during rotation of each transmission gear 22 (the first transmission gear 221 or the second transmission gear 222).

Referring to FIGS. 5, 7 to 9, the driving gear 21 has a first central axis extending along the front-rear direction. Each transmission gear 22 has a second central axis extending in the top-bottom direction perpendicular to the first central axis. Each linkage gear 23 has a third central axis extending in the top-bottom direction parallel to the second central axis. The actuating member 1 actuates the driving gear 21 to rotate around the first central axis. The transmission gears 22 are driven by the driving gear 21 to rotate around the second central axis. The linkage gears 23 are respectively and correspondingly driven by the transmission gears 22 to rotate around each own third central axis. The second central axis is the common axis of the first transmission gear 221 and the second transmission gear 222. The third central axes are two arranged in parallel comprising one of the third central axes and the other one of the third central axes. The first transmission gear 221 and the second transmission gear 222 are both driven by the driving gear 21 to rotate synchronously and in opposite circumferential directions around the second central axis. The first linkage gear 231 is driven by the first transmission gear 221 to rotate around the one of the third central axes while the second linkage gear 232 is driven by the second transmission gear 222 to rotate around the other one of the third central axes. Therefore, the first linkage gear 231 and the second linkage gear 232 also rotate synchronously and in opposite circumferential directions.

Figure 8:
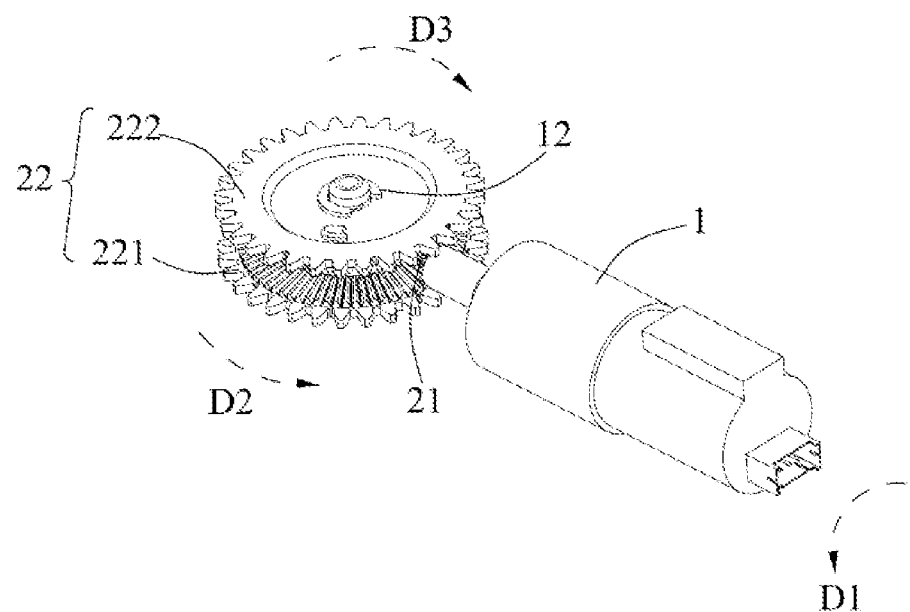
FIG. 8 is a perspective view of the combination of the actuating member, the driving gear and the transmission gear in FIG. 7.
Figure 9:
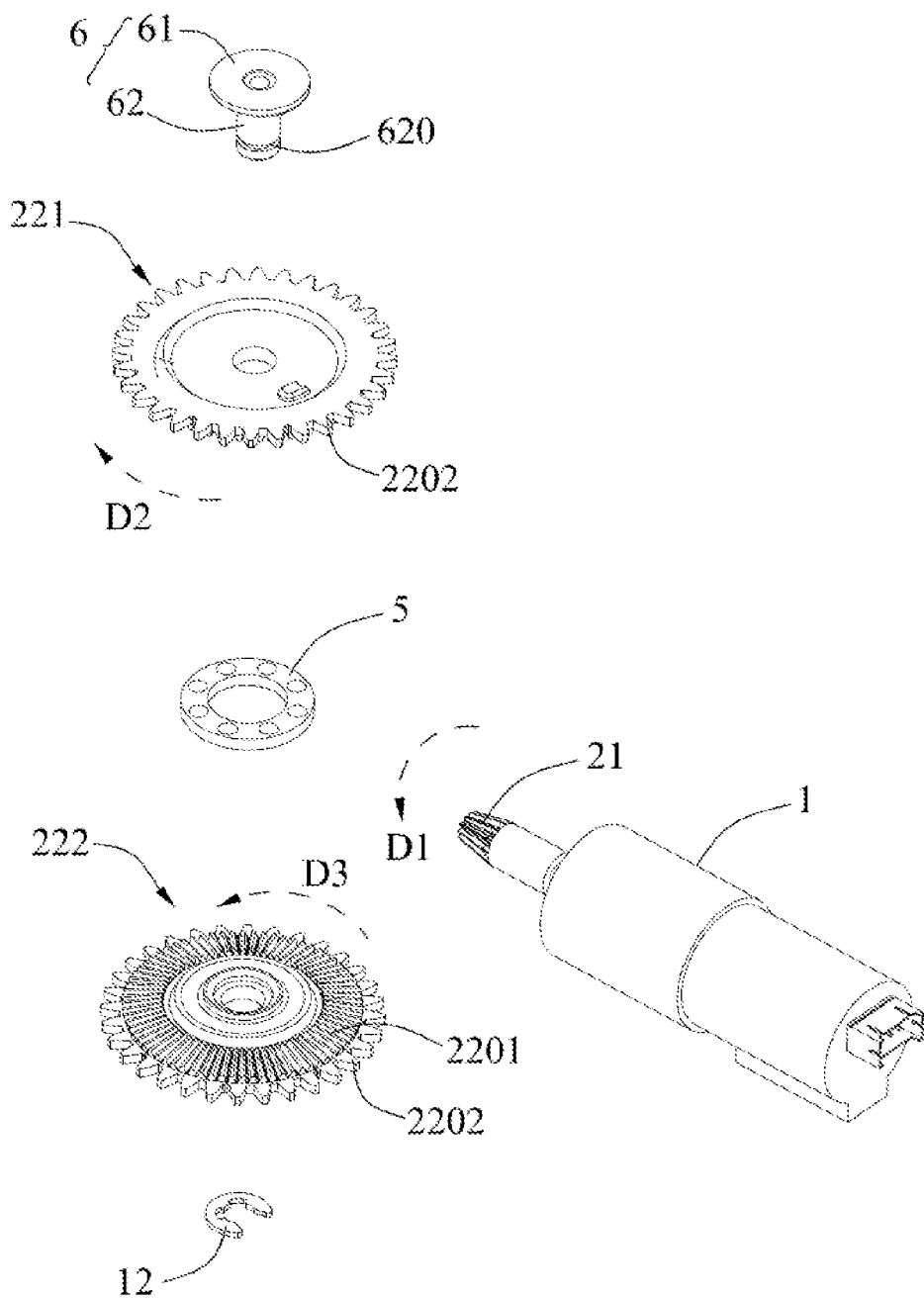
FIG. 9 is a perspective, exploded view of FIG. 8 from an angle.
Figure 10:
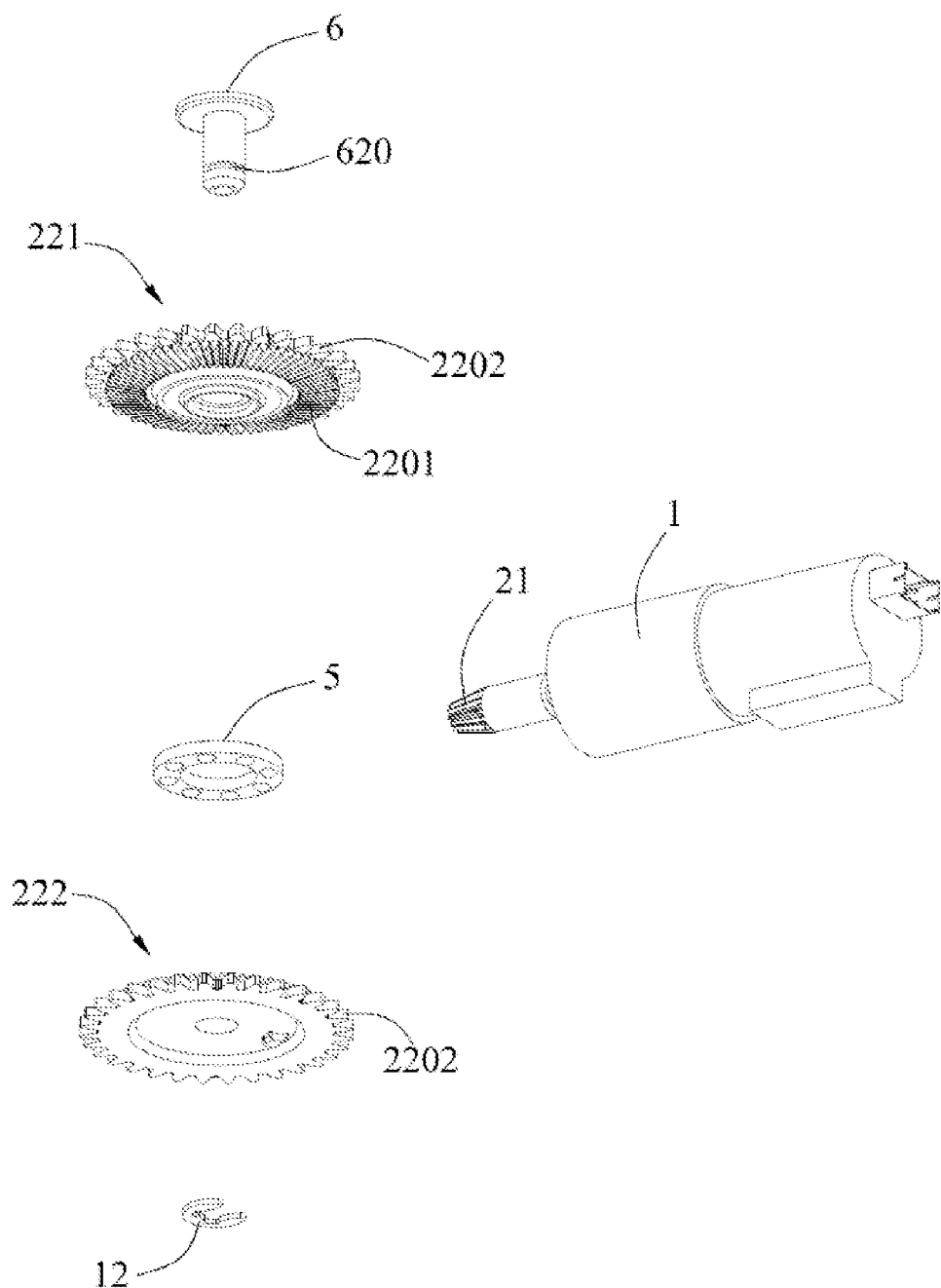
FIG. 10 is another perspective, exploded view of FIG. 8 from another angle.
Figure 11:
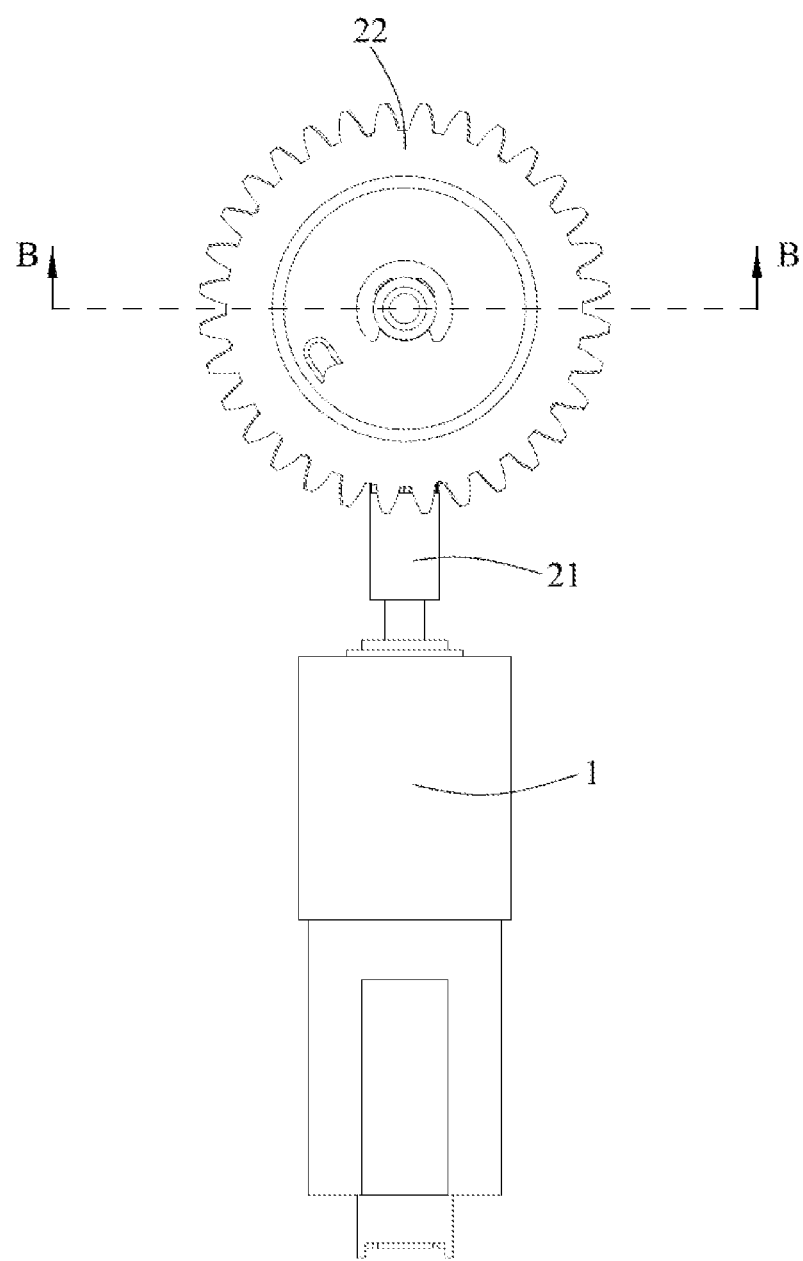
FIG. 11 is a top plan view of FIG. 8.

For example, in FIGS. 8 and 9, when the driving gear 21 rotates in the direction D1 around the first central axis, the first transmission gear 221 rotates in the direction D2 around the second central axis, additionally, the second transmission gear 222 rotates in the D3 direction around the second central axis. In FIGS. 7, 8 and 9, because the first transmission gear 221 rotates in the D2 direction around the second central axis, the first linkage gear 231 rotates in the D4 direction. And in FIGS. 7, 8 and 9, because the second transmission gear 222 rotates in the D3 direction around the second central axis, the second linkage gear 232 rotates in the D5 direction.

Figure 12:
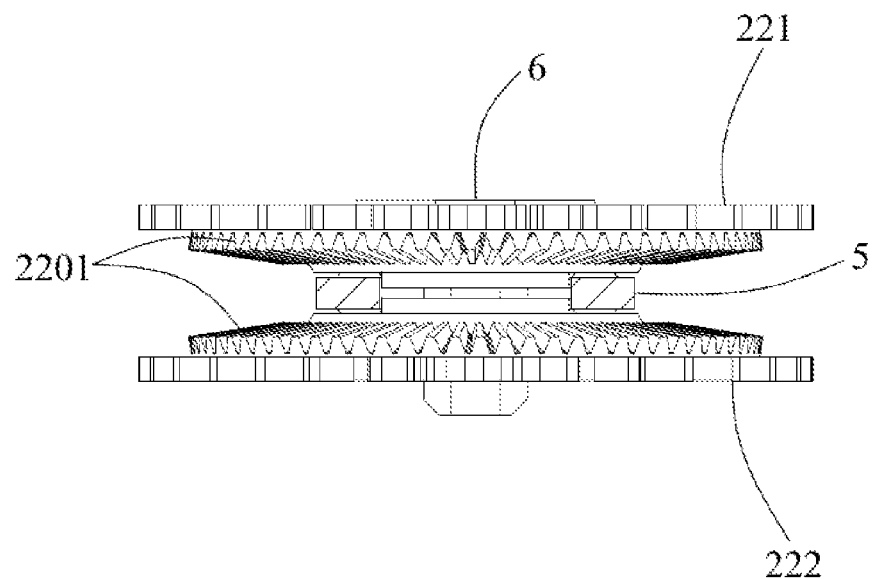
FIG. 12 is a cross-sectional view taken along line B-B in FIG. 11 and turned upside down.
Figure 13:
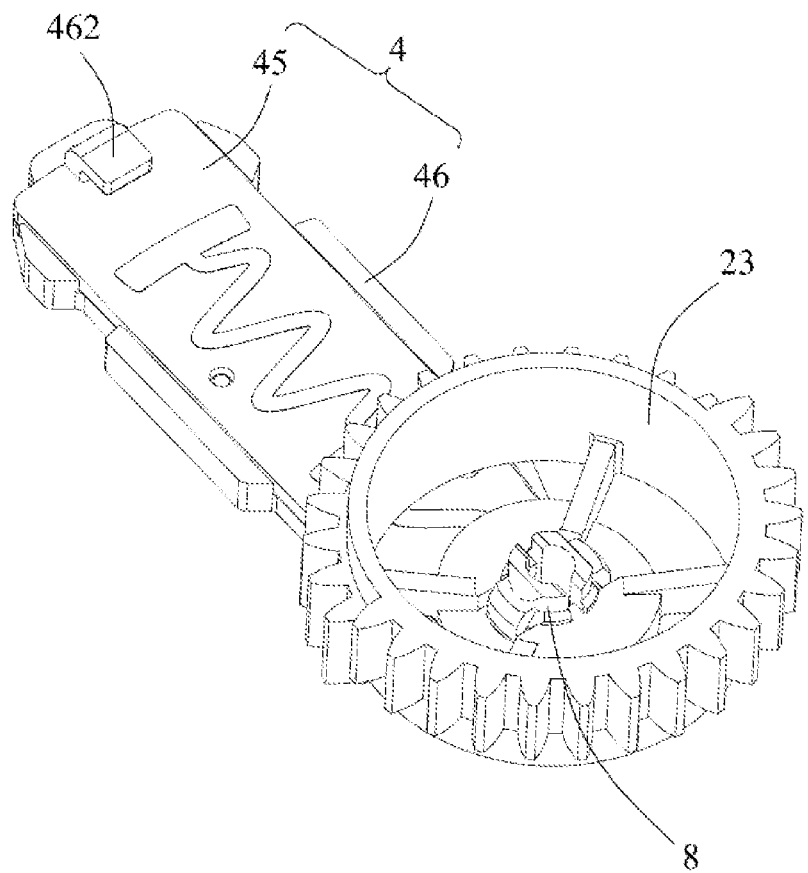
FIG. 13 is a perspective view of the combination of one brush member and one linkage gear in FIG. 7, and similar to FIG. 7, the backing plate and the two main printed circuit boards are not shown in FIG. 13.
Figure 14:
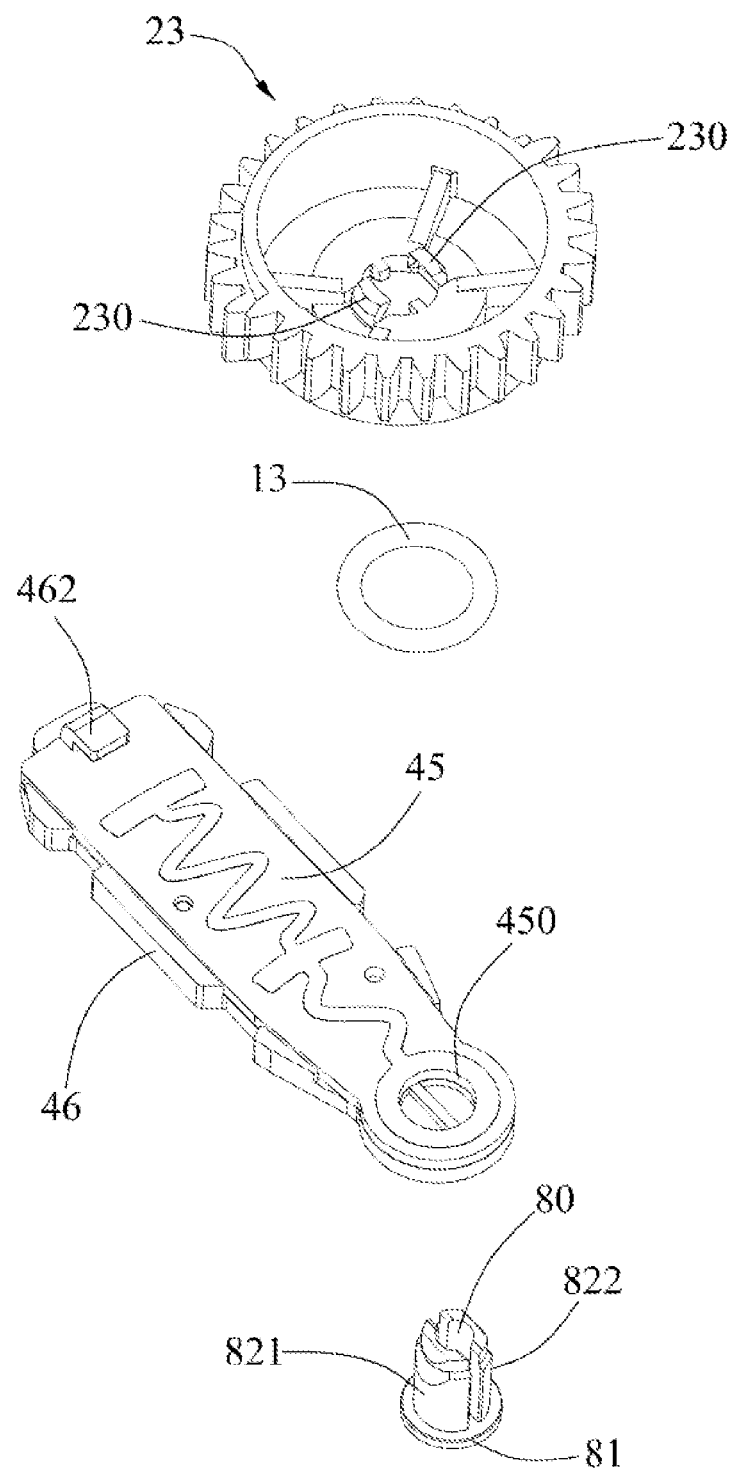
FIG. 14 is a perspective, exploded view of FIG. 13 from an angle.
Figure 18:
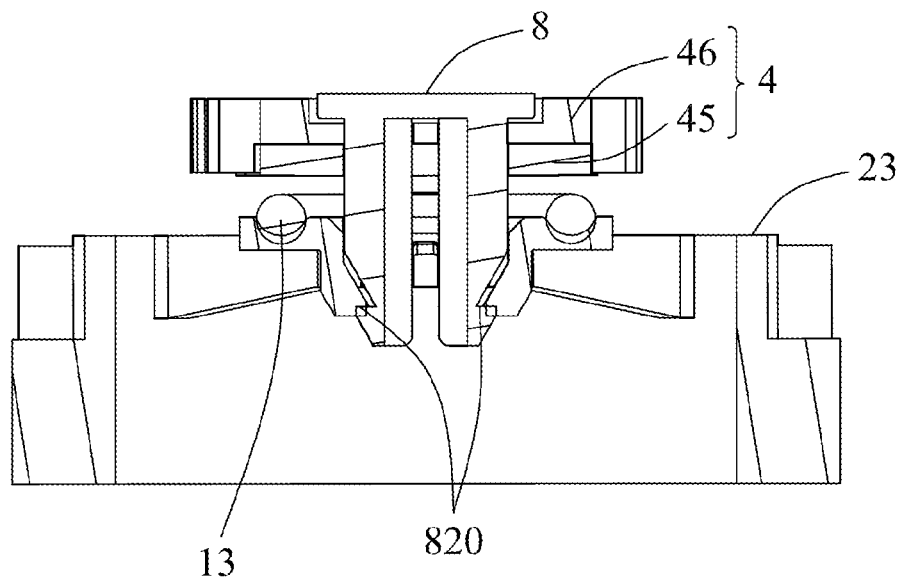
FIG. 18 is a cross-sectional view taken along line C-C in FIG. 17 and turned upside down.
Figure 19:
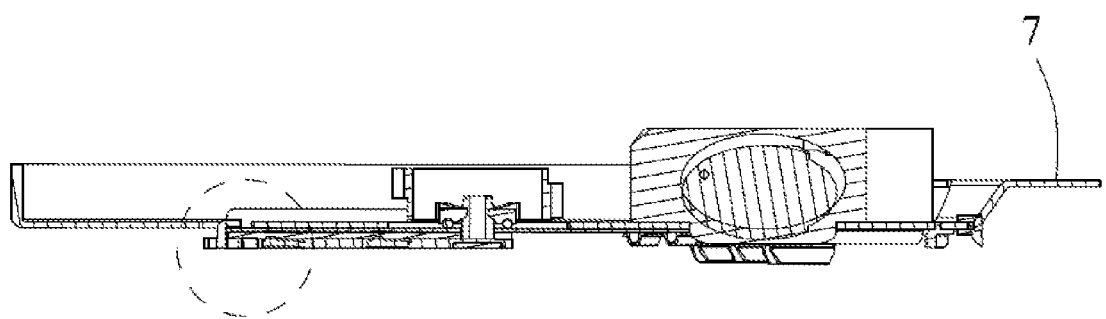
FIG. 19 is a cross-sectional view taken along line D-D in FIG. 2.
Figure 20:
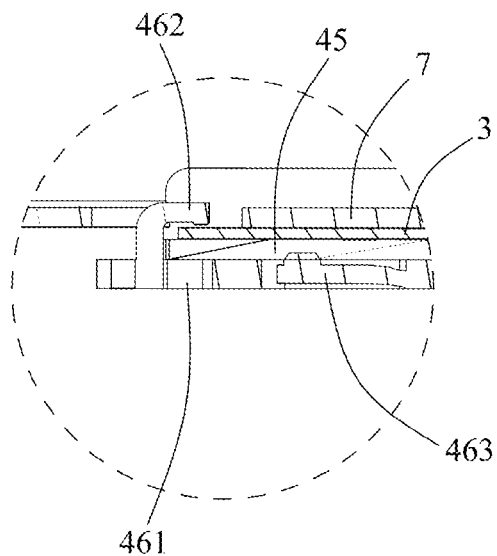
FIG. 20 is a partially enlarged view of FIG. 19.
Figure 21:
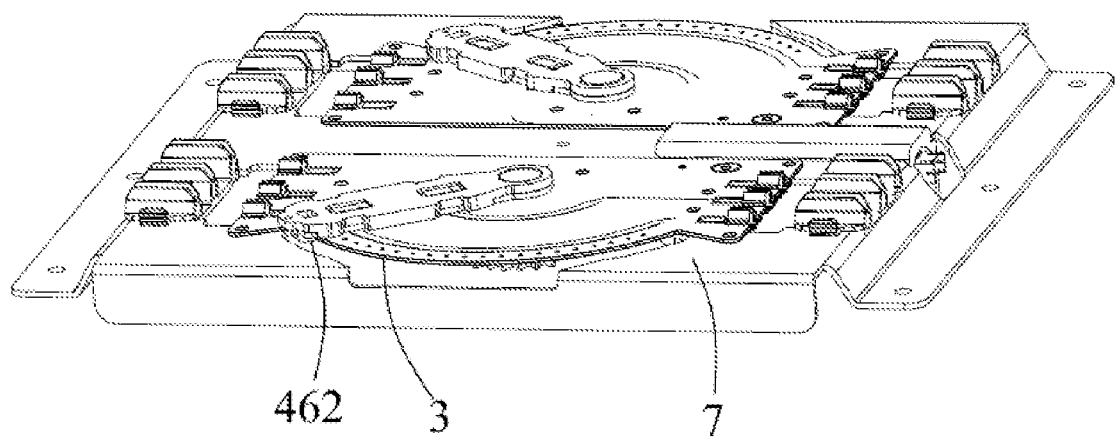
FIG. 21 is another perspective, assembled view of the brush phase shifter from another angle.
Figure 22:
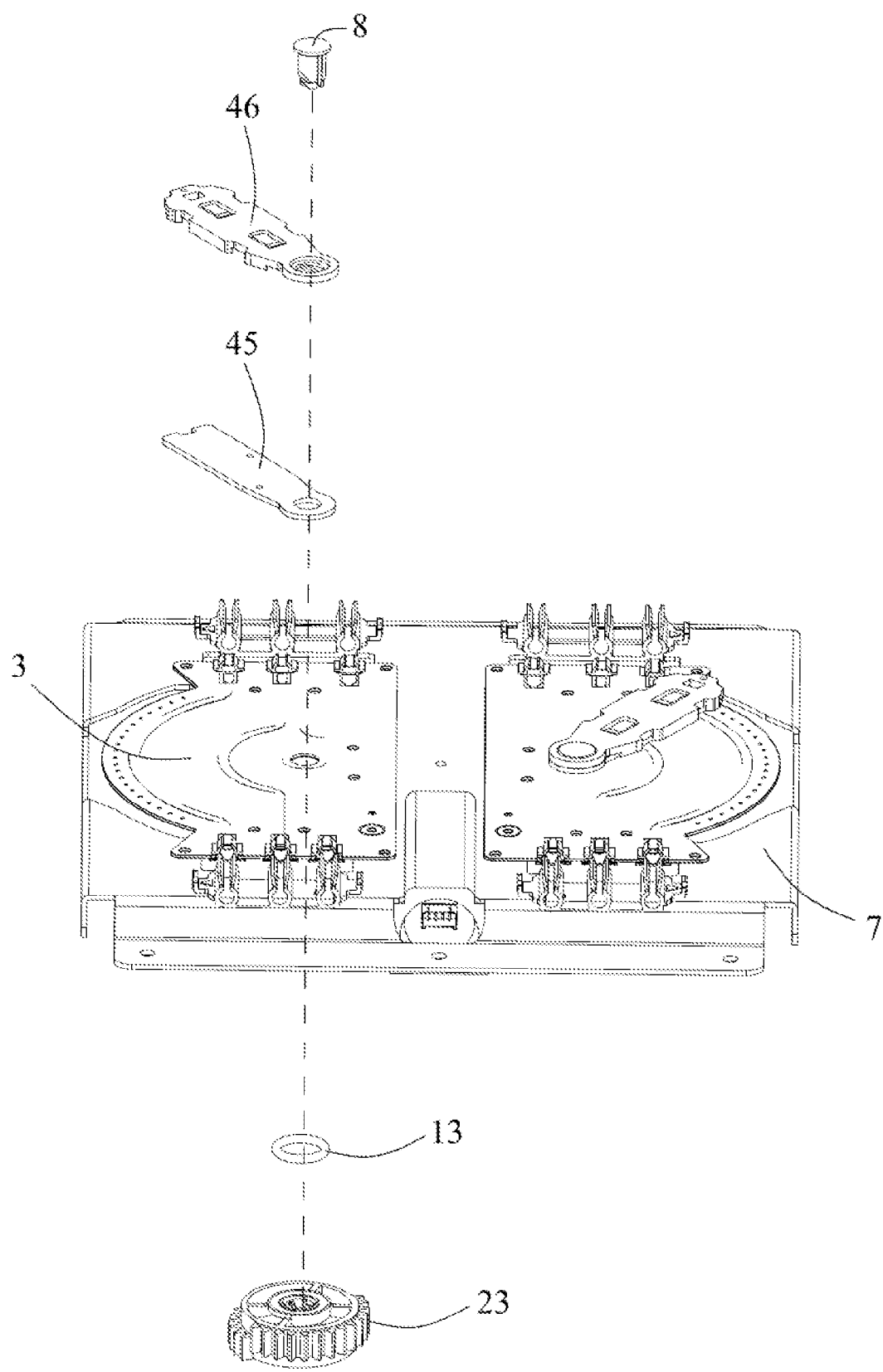
FIG. 22 is a partially perspective, exploded view of FIG. 21.

Referring to FIG. 9 and FIG. 12, since the first transmission gear 221 and the second transmission gear 222 are in a reverse rotational connection relationship, the brush phase shifter 100 has a bearing 5 located between the first transmission gear 221 and the second transmission gear 222 for reducing frictional force. Referring to FIG. 15 and FIG. 18, since the linkage gear 23 also rotates relative to the main printed circuit board 3, the brush phase shifter 100 also has a rubber ring 13 located between the linkage gear 23 and the main printed circuit board 3. The rubber ring 13 uses its own elasticity to compensate for the fitting clearance; so that the main printed circuit boards 3 and the brushed circuit boards 45 described below are closely attached to ensure the coupling effect. In addition, the rubber ring 13 isolates the main printed circuit board 3 and the linkage gear 23 to avoid rigid contact, reduce the contact surface, and reduce rotational wear. It should be noted that, the number of the bearing 5 may be one optionally and two rubber rings 13 are provided accordingly when there are two linkage gears 23.

Referring to FIGS. 16, 19 to 23, the main printed circuit board 3 includes an upper surface 301 and a lower surface 302 disposed opposite to each other. The upper surface 301 is provided with primary transmission lines (not numbered). The brush member 4 includes a brushed circuit board 45 and a pressing block 46. The brushed circuit board 45 includes a top surface 451 and a bottom surface 452 disposed opposite to each other. The bottom surface 452 faces the upper surface 301 and is provided with a secondary transmission line (not numbered) to accordingly form an electrical coupling between the primary transmission line and the secondary transmission line. The pressing block 46 and the brushed circuit board 45 are fixed together. In addition to the main body portion 461 located above the top surface 451, the pressing block 46 also includes a buckle portion 462 and an elastic portion 463. The buckle portion 462 is bent and extends from one end of the main body portion 461, and the buckle portion 462 is buckled with the lower surface 302 of the main printed circuit board 3. The elastic portion 463 elastically presses the printed circuit board 45 against the upper surface 301 of the main printed circuit board 3. The buckle portion 462 is a distal end of the pressing block 46 distal away from a pivoting end for rotating purpose, and the distal end is buckling and limited to the other side of the main printed circuit board 3. During the rotation of the brush member 4, the buckle portion 462 ensures that the brush member 4 and the main printed circuit board 3 are not easily separated. The elastic portion 463 provides a downward force for the brushed circuit board 45 to ensure the stability of the electrical connection between the secondary transmission line of the brushed circuit board 45 and the primary transmission line of the main printed circuit board 3.

It should be emphasized that, the brush phase shifter 100 at least includes one of the buckle portion 462 and the elastic portion 463, that is, the buckle portion 462 and the elastic portion 463 are not necessarily provided in the present disclosure at the same time.

By physically (mechanically) rotating the brush member 4 over the main printed circuit board 3, it is possible to change the positions where the sub-components of the RF (Radio Frequency) signals are capacitively coupled back to the main printed circuit board 3, so that the path length of each sub-component of the RF signal from the respective transmission paths of the brush members 4 to the associated radiating elements will vary. Variations in these path lengths will result in phase variations of the respective subcomponents of the RF signal. The above working principle of the brush member 4 is known to those skilled in the art, and will not be repeatedly described in the present disclosure.

Figure 23:
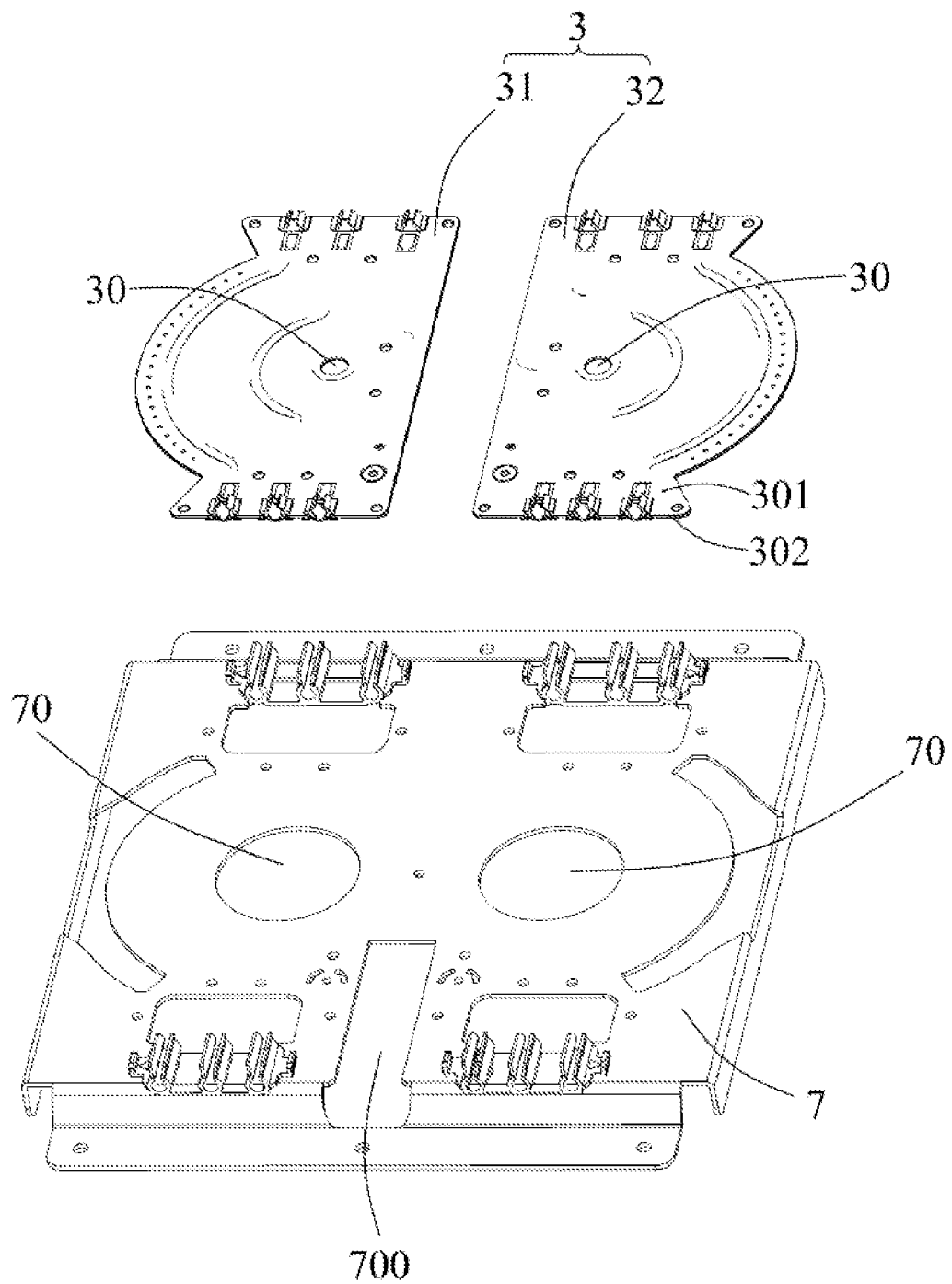
FIG. 23 is a further exploded view of two main printed circuit boards and a backing plate of FIG. 22.

Referring to FIGS. 1 and 23, in the first embodiment of the brush phase shifter 100, the main printed circuit board 3 includes a first main printed circuit board 31 and a second main printed circuit board 32. The first main printed circuit board 31 and the second main printed circuit board 32 are axially symmetrical in the left-right direction. The brush members 4 include a first brush member 41 and a second brush member 42. The first brush member 41 is rotatably disposed on the first main printed circuit board 31 and the second brush member 42 is rotatably disposed on the second main printed circuit board 32. The first brush member 41 and the second brush member 42 are also axially symmetrical in the left-right direction. In this way, the brush phase shifter 100 can ensure synchronous phase shifting to control the precision of the phase shifting.

Referring to FIG. 1 to FIG. 4, FIG. 6 and FIG. 23, the brush phase shifter 100 further includes a backing plate 7. The backing plate 7 includes a top face 71 and a bottom face 72 which are disposed opposite to each other. The first main printed circuit board 31, the second main printed circuit board 32, the first brush member 41 and the second brush member 42 are mounted and positioned on the top face 71 of the backing plate 7. The driving gear 21, the first transmission gear 221, the second transmission gear 222, the first linkage gear 231 and the second linkage gear 232 are installed and positioned on the bottom face 72 of the backing plate 7. Specifically, the backing plate 7 has a pair of through holes 70. The first linkage gear 231 can be correspondingly positioned on the first main printed circuit board 31 through one of the through holes 70. The second linkage gear 232 can be correspondingly positioned on the second main printed circuit board 32 through another through hole 70. Corresponding to each through hole 70, each main printed circuit board 3 defines a hole 30. In this way, the driving part and the signal transmission part of the brush phase shifter 100 are located on opposite sides of the backing plate 7 and do not interfere with each other.

Referring to FIG. 5 to FIG. 18, it should be noted that the present disclosure further includes a pin shaft 6, two pin buckles 8, and a clamp washer 12 with an opening (not numbered). The pin shaft 6 and the clamp washer 12 are independently formed and commonly used for the positioning connection between the first transmission gear 221, the bearing 5 and the second transmission gear 222. Each pin buckle 8 is used for positioning the main printed circuit board 3, the brush member 4 and the linkage gear 23 on the backing plate 7 from the upper and lower sides, respectively. The main printed circuit board 3 and the brush members 4 are located above the backing plate 7. The linkage gear 23 is located below the backing plate 7.

Referring to FIGS. 7 to 12, the pin shaft 6 includes a base plate 61 and a positioning post 62 extending from the base plate 61. The positioning post 62 has a groove 620 surrounding the axis thereof. After the pin shaft 6 passes through the first transmission gear 221, the bearing 5 and the second transmission gear 222 in sequence, the base plate 61 abuts on the first transmission gear 221. The clamp washer 12 is snapped into the groove 620 and therefore, is positioned against the second transmission gear 222. Of course, the pin shaft 6 can also be exchanged up and down to pass through the second transmission gear 222, the bearing 5 and the first transmission gear 221 in sequence, the base plate 61 reversely abuts on the second transmission gear 222. The clamp washer 12 is clipped into the groove 620 and is reversely positioned against the first transmission gear 221.

Referring to FIGS. 13 to 18, the pressing block 46 has a first pivot hole 460 and the printed circuit board 45 has a second pivot hole 450. Each pin buckle 8 includes a base portion 81 and a pair of positioning portions 82 extending from the base portion 81. The positioning portion 82 includes a first positioning portion 821 and a second positioning portion 822, which two are positioned side by side and spaced apart. A gap 80 is formed between the first positioning portion 821 and the second positioning portion 822. A hook 820 is formed at the end of each positioning portion 82. Each linkage gear 23 forms a convex portion 230. The pin buckle 8 passes through the first pivot hole 460 of the pressing block 46, the second pivot hole 450 of the brushed circuit board 45, the through hole 70 of the backing plate 7, the hole 30 of the main printed circuit board 3, the annular cavity of the rubber ring 13, and the central axis of the linkage gear 23. The base portion 81 abuts on the pressing block 46 and the hook 820 is engaged with the convex portion 230 to prevent the pin buckle 8 falling off from the linkage gear 23. A connecting arm 4600 is formed in the first pivot hole 460 and two ends of the connecting arm 4600 are respectively connected to the main body portion 461. When the pin buckle 8 passes through the first pivot hole 460 of the pressing block 46, the first positioning portion 821 and the second positioning portion 822 are located on two sides of the connecting arm 4600 respectively. Therefore, the linkage gear 23 can drive the pressing block 46 to actuate the printed circuit board 45.

There is also a control module (not shown) and at least two control lines (not shown) related to the present disclosure. Referring to FIG. 3, FIG. 4 and FIG. 23, the backing plate 7 is provided with a lengthwise slot 700, the actuating member 1 is accommodated in a casing 11, and the casing 11 is embedded in the lengthwise slot 700 to ensure stability. The actuating member 1, the driving gear 21, the first transmission gear 221, the second transmission gear 222, the first linkage gear 231, the second linkage gear 232, the first main printed circuit board 31, the second main printed circuit board 32, the first brush member 41 and the second brush member 42 are all mounted on the backing plate 7 to form an integrated whole brush phase shifter 100. After the integration, each brush phase shifter 100 can be electrically connected to the control module through one of the control lines, and therefore, the control module and the plurality of brush phase shifters 100 can be electrically connected via the flexible control lines. The traditional mechanical connection is omitted, the space occupied is greatly reduced, and the layout is more flexible.

In the first embodiment of the present disclosure, one actuating member 1 simultaneously controls two brush members 4 (one dragging two) to perform left-right symmetrical phase shifting, which ensures the synchronization of the phase shifting. The actuating member 1, the gear assembly 2, the main printed circuit board 3 and the brush members 4 are integrated on the backing plate 7 to form the brush phase shifter 100. The control module and the integrated at least two brush phase shifters 100 can be connected in a one-to-one correspondence through at least two control lines. The use of control lines greatly reduces the space occupation and makes the layout more flexible. It has absolute advantages for multi-port and miniaturized independent ESC antennas. The integrated design reduces product cost and assembly difficulty, and improves production efficiency.

Figure 24:
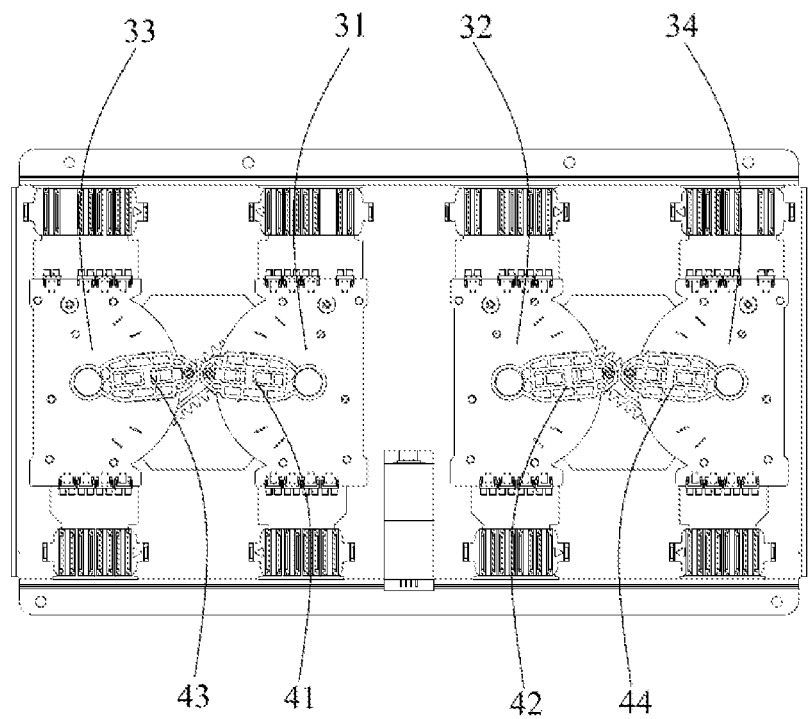
FIG. 24 is a top plan view of the brush phase shifter according to a second embodiment of the present disclosure.
Figure 25:
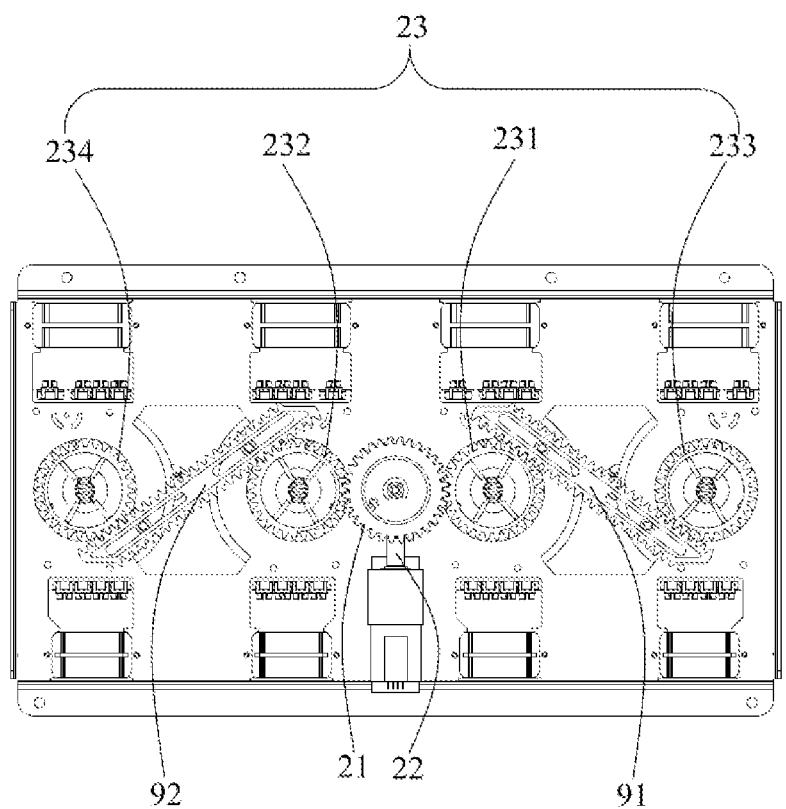
FIG. 25 is a bottom plan view of the brush phase shifter according to the second embodiment of the present disclosure.

Referring to FIG. 24 and FIG. 25, the second embodiment of the present application is introduced below:

The main structure of the second embodiment is the same as that of the first embodiment, the difference is: the main printed circuit board 3 further includes a third main printed circuit board 33 and a fourth main printed circuit board 34 arranged on the top face 71 of the backing plate 7. The brush members 4 further include a third brush member 43 rotatably disposed on the third main printed circuit board 33 and a fourth brush member 44 rotatably disposed on the fourth main printed circuit board 34. The second embodiment is also provided with a first toothed rack 91, a second toothed rack 92, a third linkage gear 233 and a fourth linkage gear 234 on the bottom face 72 of the backing plate 7. The opposite sides of the first toothed rack 91 and the second toothed rack 92 are designed with tooth patterns. The first linkage gear 231 and the third linkage gear 233 are respectively engaged with opposite sides of the first toothed rack 91 to drive the rotation of the third brush member 43 on the third main printed circuit board 33. The second linkage gear 232 and the fourth linkage gear 234 are respectively engaged with opposite sides of the second toothed rack 92 to drive the rotation of the fourth brush member 44 on the fourth main printed circuit board 34. Therefore, on the basis of the first embodiment of the present disclosure, by adding a "gear and rack" design, one actuating member 1 can control multiple brush members 4. Specifically, the second embodiment of the present disclosure realizes that one actuating member 1 simultaneously controls four brush members 4 (one dragging four) to perform phase shifting. Therefore, compared with the first embodiment, the second embodiment can be used for antennas with more ports, which further reduces the occupied space.

The above embodiments are only used to illustrate the present disclosure and not to limit the technical solutions described in the present disclosure. The understanding of this specification should be based on those skilled in the art. Descriptions of directions, such as "front", "back", "left", "right", "top" and "bottom", although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A brush phase shifter, comprising:
   an actuating member;
   a gear assembly, the gear assembly comprising a driving gear, a transmission gear and a linkage gear, the driving gear being a bevel gear, the transmission gear comprising a bevel gear portion and a cylindrical gear portion, the bevel gear portion having a large end and a small end, the cylindrical gear portion being integrally formed at the large end of the bevel gear portion, the linkage gear being a cylindrical gear, the driving gear meshing with the bevel gear portion of the transmission gear, the cylindrical gear portion of the transmission gear meshing with the linkage gear;
   at least one main printed circuit board; and
   at least one brush member, the brush member being fixedly connected with the linkage gear such that the brush member is rotatably arranged on the main printed circuit board.

2. The brush phase shifter according to claim 1, wherein the driving gear defines a first central axis extending along a front-rear direction;
   the transmission gear comprises a first transmission gear and a second transmission gear;
   the first transmission gear and the second transmission gear are synchronously driven by the driving gear, the first transmission gear and the second transmission gear rotate in opposite circumferential directions.

3. The brush phase shifter according to claim 2, wherein the first transmission gear and the second transmission gear have two of the bevel gear portions and two of the cylindrical gear portions in total; and
   wherein the two cylindrical gear portions are arranged at intervals in a top-bottom direction perpendicular to the front-rear direction, the two bevel gear parts are face-to-face arranged so that the two bevel gear portions mesh with the driving gear at two opposite sides of the driving gear.

4. The brush phase shifter according to claim 3, wherein the linkage gear comprises a first linkage gear and a second linkage gear; each linkage gear alternatively engages with the two transmission gears, but the two linkage gears cannot simultaneously engage with the same transmission gear.

5. The brush phase shifter according to claim 4, wherein each linkage gear has an outer surface with a circular cross section;

the first linkage gear comprises a first dentate portion and a second dentate portion at the outer surface thereof, the second linkage gear comprises a third dentate portion and a fourth dentate portion at the outer surface thereof, the first dentate portion and the second dentate portion are vertically dislocated and distributed in parallel, the third dentate portion and the fourth dentate portion are vertically dislocated and distributed in parallel too; positive projections of the first dentate portion and the second dentate portion on the cross section of the first linkage gear are connected from heading to ending, which forms a closed loop, positive projections of the third dentate portion and the fourth dentate portion on the cross section of the second linkage gear are connected from heading to ending, which forms another closed loop too.

6. The brush phase shifter according to claim 5, wherein both the first linkage gear and the second linkage gear are respectively driven by the first transmission gear or the second transmission gear, the first linkage gear and the second linkage gear also rotate synchronously and in opposite circumferential directions.

7. The brush phase shifter according to claim 6, wherein when the cylindrical gear portion of the first transmission gear meshes with the first dentate portion of the first linkage gear, as well as, when the cylindrical gear portion of the second transmission gear meshes with the fourth dentate portion of the second linkage gear, the cylindrical gear portion of the first transmission gear is separated from the third dentate portion of the second linkage gear, as well as, the cylindrical gear portion of the second transmission gear is separated from the second dentate portion of the first linkage gear;

when the cylindrical gear portion of the first transmission gear meshes with the third dentate portion of the second linkage gear, as well as, when the cylindrical gear portion of the second transmission gear meshes with the second dentate portion of the first linkage gear, the cylindrical gear portion of the first transmission gear is separated from the first dentate portion of the first linkage gear, as well as, the cylindrical gear portion of the second transmission gear is separated from the fourth dentate portion of the second linkage gear.

8. The brush phase shifter according to claim 4, further comprising a left-right direction perpendicular to both the front-rear direction and the top-bottom direction;

wherein the main printed circuit boards comprise a first main printed circuit board and a second main printed circuit board, the first main printed circuit board and the second main printed circuit board are axially symmetrical in the left-right direction;

wherein the brush members comprise a first brush member and a second brush member, the first brush member is rotatably disposed on the first main printed circuit board and the second brush member is rotatably disposed on the second main printed circuit board, the first brush member and the second brush member are also axially symmetrical in the left-right direction.

9. The brush phase shifter according to claim 8, further comprising a backing plate, the backing plate comprising a top face and a bottom face which are disposed opposite to each other;

wherein the first main printed circuit board, the second main printed circuit board, the first brush member and the second brush member are positioned on the top face of the backing plate, the driving gear, the first transmission gear, the second transmission gear, the first linkage gear and the second linkage gear are positioned on the bottom face of the backing plate;

wherein the backing plate comprises a pair of through holes, the first linkage gear is correspondingly positioned on the first main printed circuit board through one of the through holes, and the second linkage gear is correspondingly positioned on the second main printed circuit board through another through hole.

10. The brush phase shifter according to claim 9, further comprising a first toothed rack, a second toothed rack, a third linkage gear and a fourth linkage gear on the bottom face of the backing plate;

wherein the main printed circuit boards further comprise a third main printed circuit board and a fourth main printed circuit board arranged on the top face of the backing plate; wherein the brush members further comprise a third brush member rotatably disposed on the third main printed circuit board and a fourth brush member rotatably disposed on the fourth main printed circuit board;

wherein two opposite sides both of the first toothed rack and the second toothed rack are designed with tooth patterns, the first linkage gear and the third linkage gear are respectively engaged with the two opposite sides of the first toothed rack to drive the rotation of the third brush member on the third main printed circuit board, the second linkage gear and the fourth linkage gear are respectively engaged with the two opposite sides of the second toothed rack to drive the rotation of the fourth brush member on the fourth main printed circuit board.

11. The brush phase shifter according to claim 9, further comprising a pin shaft and a clamp washer with an opening;

wherein the pin shaft defines a groove surrounding an axis thereof, the clamp washer is snapped into the groove and therefore, the clamp washer is positioned against the first transmission gear or the second transmission gear.

12. The brush phase shifter according to claim 11, further comprising a bearing located between the first transmission gear and the second transmission gear for reducing frictional force.

13. The brush phase shifter according to claim 9, further comprising two pin buckles;

wherein each pin buckle comprises two positioning portions which are positioned side by side and spaced apart, a hook is formed at the end of each positioning portion, each linkage gear forms a convex portion, the hook is engaged with the convex portion to prevent the pin buckle falling off from the linkage gear.

14. The brush phase shifter according to claim 13, further comprising two rubber rings, each rubber ring located between each linkage gear and the corresponding main printed circuit board to compensate for the fitting clearance.

15. The brush phase shifter according to claim 1, wherein the main printed circuit board comprises an upper surface and a lower surface disposed opposite to each other, the upper surface is provided with primary transmission lines;

wherein the brush member comprises a brushed circuit board and a pressing block, the brushed circuit board comprises a top surface and a bottom surface disposed opposite to each other, the bottom surface faces the upper surface and is provided with a secondary transmission line to accordingly form an electrical coupling between the primary transmission line and the secondary transmission line;

wherein the pressing block and the brushed circuit board are fixed together, in addition to the main body portion located above the top surface, the pressing block further comprises a buckle portion and an elastic portion, the buckle portion is bent from the main body portion and buckled with the lower surface of the main printed circuit board; and/or wherein the elastic portion elastically presses the brushed circuit board against the upper surface of the main printed circuit board.

16. A brush phase shifter, comprising:

an actuating member;

a gear assembly, the gear assembly comprising a driving gear, a pair of transmission gears symmetrically positioned in an upper-lower direction and a pair of linkage gears symmetrically positioned in a left-right direction, the transmission gears comprising a first transmission gear and a second transmission gear, the linkage gears comprising a first linkage gear and a second linkage gear, the driving gear being a bevel gear, each transmission gear comprising a bevel gear portion and a cylindrical gear portion, each bevel gear portion having a large end and a small end, the corresponding cylindrical gear portion being integrally formed at the large end of each bevel gear portion, each linkage gear being a cylindrical gear, the driving gear meshing with the face-to-face bevel gear portions, the cylindrical gear portion meshing with the adjacent linkage gear and detaching from another distant linkage gear during rotation of each transmission gear;

a first main printed circuit board and a second main printed circuit board axially symmetrically positioned in the left-right direction; and a first brush member and a second brush member also axially symmetrically positioned in the left-right direction;

wherein both the first brush member is rotatably disposed on the first main printed circuit board and the second brush member is rotatably disposed on the second main printed circuit board when the actuating member actuates the gear assembly.

17. The brush phase shifter according to claim 16, further comprising a first toothed rack, a second toothed rack, a third linkage gear and a fourth linkage gear on the bottom face of the backing plate;

further comprising a third main printed circuit board and a fourth main printed circuit board arranged on the top face of the backing plate;

further comprising a third brush member rotatably disposed on the third main printed circuit board and a fourth brush member rotatably disposed on the fourth main printed circuit board;

wherein two opposite sides both of the first toothed rack and the second toothed rack are designed with tooth patterns, the first linkage gear and the third linkage gear are respectively engaged with the two opposite sides of the first toothed rack to drive the rotation of the third brush member on the third main printed circuit board, the second linkage gear and the fourth linkage gear are respectively engaged with the two opposite sides of the second toothed rack to drive the rotation of the fourth brush member on the fourth main printed circuit board.

\* \* \* \* \*